(12) United States Patent
Curcio et al.

(10) Patent No.: US 11,284,055 B2
(45) Date of Patent: Mar. 22, 2022

(54) METHOD AND AN APPARATUS AND A COMPUTER PROGRAM PRODUCT FOR VIDEO ENCODING AND DECODING

(71) Applicant: Nokia Technologies Oy, Espoo (FI)

(72) Inventors: Igor D. Curcio, Tampere (FI); Miska Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 21 days.

(21) Appl. No.: 16/025,241

(22) Filed: Jul. 2, 2018

(65) Prior Publication Data
US 2019/0014304 A1 Jan. 10, 2019

(30) Foreign Application Priority Data
Jul. 7, 2017 (FI) ...................................... 20175663

(51) Int. Cl.
*H04N 13/161* (2018.01)
*H04N 19/597* (2014.01)
(Continued)

(52) U.S. Cl.
CPC ......... *H04N 13/161* (2018.05); *H04L 65/607* (2013.01); *H04L 65/80* (2013.01); *H04N 5/23238* (2013.01); *H04N 19/132* (2014.11); *H04N 19/154* (2014.11); *H04N 19/17* (2014.11); *H04N 19/597* (2014.11); *H04N 19/70* (2014.11); *H04N 21/21805* (2013.01);
(Continued)

(58) Field of Classification Search
CPC .. H04N 13/161; H04N 19/132; H04N 19/154; H04N 19/17; H04N 19/597; H04N 19/70; H04N 5/23238; H04N 21/21805; H04N 21/234345; H04N 21/235; H04N 21/816; H04N 19/86; H04L 65/607; H04L 65/80
USPC ........................................................ 348/36
See application file for complete search history.

(56) References Cited

U.S. PATENT DOCUMENTS 10,419,738 B1 * 9/2019 Phillips ................ H04N 13/161
2011/0205336 A1 * 8/2011 Fukuda ................ H04N 13/133
348/43

(Continued)

FOREIGN PATENT DOCUMENTS

| CN | 103765902 A | 4/2014 |
|---|---|---|
| JP | 2015536052 A | 12/2015 |
| WO | 2014/050090 A1 | 4/2014 |

OTHER PUBLICATIONS

Boyce et al., "HEVC Additional Supplemental Enhancement Information (Draft 2)", Joint Collaborative Team on Video Coding (JCT-VC) of ITU-T SG16 WP3 and ISO/IEC JTC1/SC29/WG11, JCTVC-AA1005, 27th Meeting, Mar. 31-Apr. 7, 2017, pp. 1-27.

(Continued)

*Primary Examiner* — Jae N Noh
(74) *Attorney, Agent, or Firm* — Alston & Bird LLP

(57) ABSTRACT

The invention relates to a method comprising encoding, into or along a bitstream of media content, a set of indicators to indicate one or more of unequality types, wherein an unequality type defines different encoding parameters for a video stream on a first view or region and for a video stream on a second view or region. The invention also relates to an apparatus and a computer program product for implementing the method.

10 Claims, 7 Drawing Sheets

(51) Int. Cl.

| | |
|---|---|
| *H04N 19/17* | (2014.01) |
| *H04N 21/2343* | (2011.01) |
| *H04N 19/70* | (2014.01) |
| *H04N 21/218* | (2011.01) |
| *H04N 21/81* | (2011.01) |
| *H04N 21/235* | (2011.01) |
| *H04N 19/154* | (2014.01) |
| *H04N 19/132* | (2014.01) |
| *H04L 65/60* | (2022.01) |
| *H04L 65/80* | (2022.01) |
| *H04N 5/232* | (2006.01) |
| *H04N 19/86* | (2014.01) |

(52) U.S. Cl.
CPC ... *H04N 21/235* (2013.01); *H04N 21/234345* (2013.01); *H04N 21/816* (2013.01); *H04N 19/86* (2014.11)

(56) References Cited

U.S. PATENT DOCUMENTS

| | | | | |
|---|---|---|---|---|
| 2012/0269275 | A1* | 10/2012 | Hannuksela | H04N 19/61 375/240.25 |
| 2014/0037007 | A1 | 2/2014 | Lee et al. | |
| 2014/0219346 | A1 | 8/2014 | Ugur et al. | |
| 2016/0012855 | A1 | 1/2016 | Krishnan | |
| 2016/0094606 | A1 | 3/2016 | Modai et al. | |
| 2016/0353146 | A1 | 12/2016 | Weaver et al. | |
| 2017/0105007 | A1 | 4/2017 | Kim et al. | |
| 2017/0201564 | A1* | 7/2017 | Hardwick | H04L 65/4092 |
| 2018/0035047 | A1* | 2/2018 | Lei | G02B 13/06 |

OTHER PUBLICATIONS

"Parameter Values for the HDTV Standards for Production and International Programme Exchange", Recommendation ITU-R BT.709-6, Jun. 2015, 19 pages.

"Parameter Values for Ultra-High Definition Television Systems for Production and International Programme Exchange", Recommendation ITU-R BT.2020-2, Oct. 2015, 8 pages.

"Advanced Video Coding for Generic Audiovisual services", Series H: Audiovisual and Multimedia Systems Infrastructure of audiovisual services—Coding of moving Video, Recommendation ITU-T H.264, Apr. 2017, 812 pages.

"High Efficiency Video Coding", Series H: Audiovisual and Multimedia Systems Infrastructure of audiovisual services—Coding of moving video, Recommendation ITU-T H.265, Dec. 2016, 664 pages.

"Information technology—Coding of Audio-Visual Objects—Part 12: ISO Base Media File Format", ISO/IEC 14496-12, Third Edition, Oct. 15, 2008, 120 pages.

"Information technology—Coding of Audio-Visual Objects—Part 14: MP4 File Format", ISO/IEC 14496-14, First Edition, Nov. 15, 2003, 18 pages.

"Information Technology—Coding of Audio-Visual Objects—Part 15: Advanced Video Coding (AVC) File Format", ISO/IEC 14496-15, First Edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 14)", 3GPP TS 26.244, V14.0.0, Mar. 2017, pp. 1-67.

"3rd Generation Partnership Project; Technical Specification Group Services and System Aspects; Transparent end-to-end Packet-switched Streaming Service (PSS); Protocols and codecs (Release 14)", 3GPP TS 26.234, V14.0.0, Mar. 2017, pp. 1-173.

"Information Technology—Dynamic Adaptive Streaming Over HTTP (DASH)—Part 1: Media Presentation Description and Segment Formats", ISO/IEC 23009-1, Second Edition, May 15, 2014, 152 pages.

Moats, "URN Syntax", Request for Comments (RFC) 2141, Network Working Group, May 1997, pp. 1-7.

Berners-Lee et al., "Uniform Resource Identifier (URI): Generic Syntax", Request for Comments (RFC) 3986, Network Working Group, Jan. 2005, pp. 1-53.

Schulzrinne et al., "RTP: A Transport Protocol for Real-Time Applications", Request for Comments (RFC) 3550, Network Working Group, Jul. 2003, pp. 1-105.

Office action received for corresponding Finnish Patent Application No. 20175663, dated Mar. 2, 2018, 9 pages.

Saygili et al., "Evaluation of Asymmetric Stereo Video Coding and Rate Scaling for Adaptive 3D Video Streaming", IEEE Transactions on Broadcasting, vol. 57, No. 2, Jun. 2011, pp. 593-601.

Aflaki et al., "Subjective Quality Assessment of Asymmetric Stereoscopic 3D Video", Signal, Image and Video Processing, vol. 9, No. 2, Feb. 2015, pp. 331-345.

Martens, "Bandwidth Management for ODV Tiled Streaming with MPEG-DASH", Thesis, 2015, 156 pages.

Office action received for corresponding Philippines Patent Application No. 1-2018-000174, dated Aug. 1, 2018, 6 pages.

Office action received for corresponding Japanese Patent Application No. 2018-114122, dated Jun. 5, 2019, 4 pages of office action and 4 pages of Translation available.

Extended European Search Report received for corresponding European Patent Application No. 18181870.9, dated Nov. 29, 2018, 7 pages.

Oh et al., "Region Wise Quality Indication SEI Message", Joint Collaborative Team on Video Coding (JCT-VC)of ITU-T SG 16 WP 3 and ISO/IEC JTC 1/SC 29/WG 11, JCTVC-AA0030, 27th Meeting, Mar. 31-Apr. 7, 2017, pp. 1-4.

Choi et al., "MV-HEVC/SHVC HLS: On Interlayer Prediction Type", Joint Collaborative Team on 3D Video Coding Extensionsof ITU-T SG 16 WP 3 and ISO/IEC JTC 1/SC 29/WG 11, JCT3V-E0114r1, 5th Meeting, Jul. 27-Aug. 2, 2013, pp. 1-4.

Choi et al., "Text of ISO/IEC DIS 23090-2 Omnidirectional Media Format", ISO/IEC JTC1/SC29/WG11 N16824, Systems, Apr. 2017, 63 pages.

Hannuksela et al., "[OMAF] Combination of M41159 and M41199", ISO/IEC JTC1/SC29/WG11 MPEG2017/M41338, Nokia, Jul. 2017, 5 pages.

Final Office action received for corresponding Japanese Patent Application No. 2018-114122, dated Feb. 25, 2022, 5 pages of office action and 5 pages of Translation available.

Office Action for Indonesian Application No. PID201804569 dated Oct. 9, 2020, 4 pages.

Office Action for European Application No. 18181870.9 dated May 21, 2021, 5 pages.

Office Action for Mexico Application No. MX/a/2018/008281 dated Aug. 19, 2021, 6 pages.

Office Action for Chinese Application No. 201810734777.9 dated Jan. 6, 2022, 8 pages.

* cited by examiner

METHOD AND AN APPARATUS AND A COMPUTER PROGRAM PRODUCT FOR VIDEO ENCODING AND DECODING

TECHNICAL FIELD

The present solution generally relates to video encoding and decoding.

BACKGROUND

Since the beginning of photography and cinematography, the most common type of image and video content has been captured by cameras with relatively narrow field of view, and displayed as a rectangular scene on flat displays. More recently, new image and video capture devices are available, which are able to capture visual and audio content all around them. Such content is referred to as 360-degree image/video or omnidirectional image/video.

Furthermore, new types of output technologies have been invented and produced, such as head-mounted displays. These devices allow a person to see visual content all around him/her. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for reducing a streaming bandwidth of media content. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising encoding, into or along a bitstream of a media content, a set of indicators to indicate one or more of unequality types, wherein an unequality type defines different encoding parameters for a video stream on a first view or region and for a video stream on a second view or region.

According to a second aspect, there is provided an apparatus comprising at least one processor, memory including computer program code, the memory and the computer program code configured to, with the at least one processor, cause the apparatus to encode, into or along a bitstream of a media content, a set of indicators to indicate one or more of unequality types, wherein an unequality type defines different encoding parameters for a video stream on a first view or region and for a video stream on a second view or region.

According to a third aspect, there is provided a computer program product embodied on a non-transitory computer readable medium, comprising computer program code configured to, when executed on at least one processor, cause an apparatus or a system to encode, into or along a bitstream of a media content, a set of indicators to indicate one or more of unequality types, wherein an unequality type defines different encoding parameters for a video stream on a first view or region and for a video stream on a second view or region.

According to an embodiment, the method, being implemented by the aforementioned apparatus and/or computer program product, further comprises including, into or along the bitstream of the media content, a first quality ranking value associated with the first view or region and a second quality ranking value associated with the second view or region, wherein an order of the first and second quality ranking values indicates which an order of perceived quality between the first view or region and the second view region.

According to an embodiment, the method, being implemented by aforementioned apparatus and/or computer program product, further comprises including, into or along the bitstream of the media content, a second set of indicators to indicate one or more of unequality types; the second set of indicators indicating the unequality types among regions having a same quality ranking value.

According to an embodiment, the method, being implemented by aforementioned apparatus and/or computer program product, further comprises encoding, into or along the bitstream of the media content, a parameter indicating which one of the video streams is of a higher quality.

According to an embodiment, the media content comprises one or more 360-degree pictures.

According to an embodiment, the set of indicators are encoded into respective bit positions of an unequality indicator mask.

DESCRIPTION OF THE DRAWINGS

In the following, various embodiments of the invention will be described in more detail with reference to the appended drawings, in which

Figure 9:
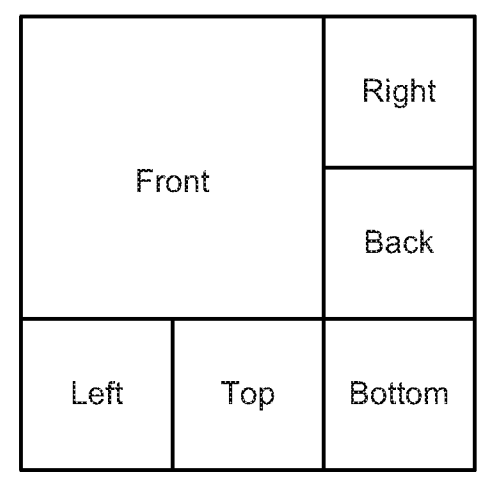

FIG. 9 shows an example of a packed virtual reality (VR) frame; and

DETAILED DESCRIPTION

The present solution relates to omnidirectional video captured with one or more cameras, wherein the video is streamed over a network, and rendered on a viewing device, for example on a Head Mounted Display (HMD). The present embodiments facilitate a reduction of streaming bandwidth of media content.

Figure 1:
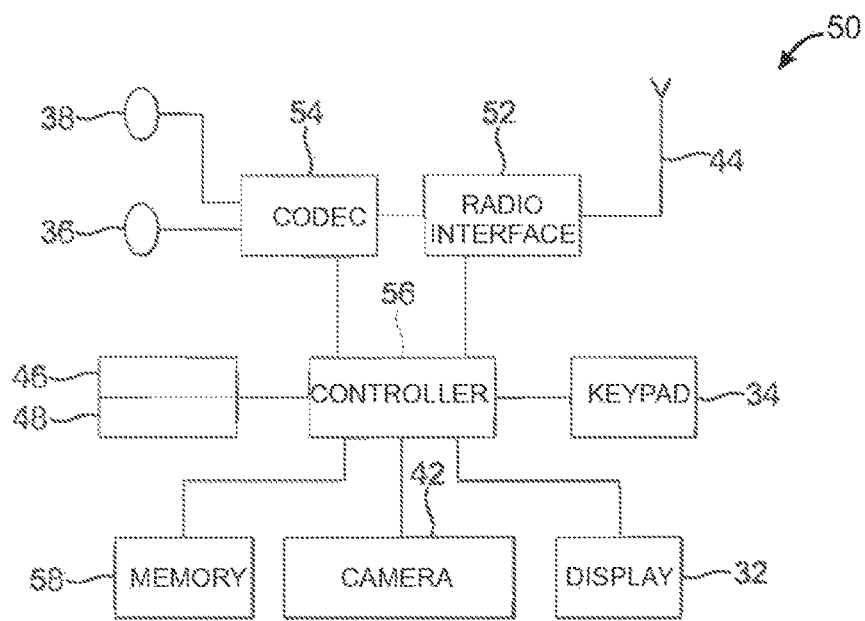
FIG. 1 shows an apparatus according to an embodiment in a simplified block chart.
Figure 2:
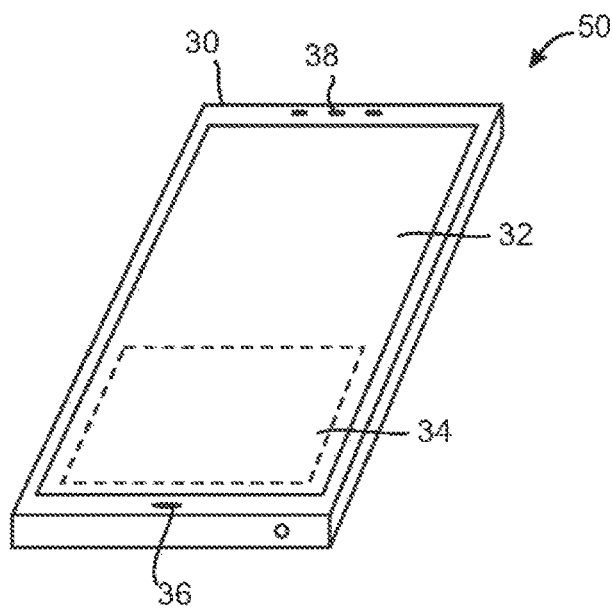
FIG. 2 shows a layout of an apparatus according to an embodiment.

Before describing the present solution in more detailed manner, an apparatus according to an embodiment is disclosed with reference to FIGS. 1 and 2.

FIG. 1 shows a block diagram of a video coding system according to an example embodiment as a schematic block diagram of an electronic device 50, which may incorporate a codec. In some embodiments the electronic device may comprise an encoder or a decoder.

FIG. 2 shows a layout of an apparatus according to an embodiment. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device.

The apparatus 50 may comprise a housing 30 for incorporating and protecting the device. The apparatus 50 may further comprise a display 32 in the form of a liquid crystal display. In other embodiments of the invention the display may be any suitable display technology suitable to display an image 30 or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 is a multi-lens camera system having at least two camera sensors. The camera is capable of recording or detecting individual frames which are then passed to the codec 54 or the controller for processing. The apparatus may receive the video and/or image data for processing from another device prior to transmission and/or storage. The apparatus is able to generate a 360-degree stereo video from the image data being captured by the camera.

The apparatus 50 may further comprise an infrared port for short range line of sight communication to other devices. According to an embodiment, the apparatus may further comprise any suitable short range communication solution such as for example a Bluetooth wireless connection or a USB (Universal Serial Bus)/firewire wired connection.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The 30 apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection. Such wired interface may be configured to operate according to one or more digital display interface standards, such as for example High-Definition Multimedia Interface (HDMI), Mobile High-definition Link (MHL), or Digital Visual Interface (DVI).

Figure 3:
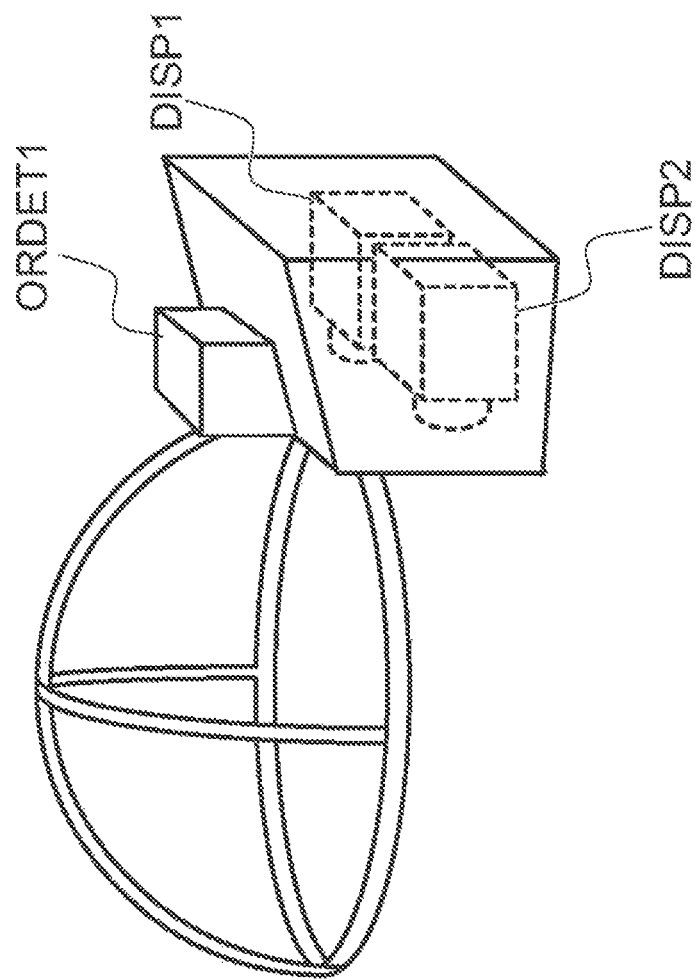
FIG. 3 shows a display device according to an embodiment.

An apparatus according to another embodiment is disclosed with reference to FIG. 3. FIG. 3 shows a block diagram of a video decoding system according to an example embodiment as a schematic block diagram of an electronic device. The video decoding system of FIG. 3 is a head-mounted display for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting circuitry ORDET1 for determining the head movements and direction of the head. The orientation detecting circuitry output may be also used for estimating user's gaze direction, or, the device may comprise gaze detection circuitry for this purpose. The head-mounted display gives a three-dimensional (3D) perception of the recorded/streamed content to a user.

Instead of head-mounted display, also augmented reality/mixed reality (AR/MR) glasses may be used as a video decoding system.

A video codec comprises an encoder that transforms an input video into a compressed representation suited for storage/transmission and a decoder that can uncompress the compressed video representation back into a viewable form. The encoder may discard some information in the original video sequence in order to represent the video in a more compact form (that is, at lower bitrate). An image codec or a picture codec is similar to a video codec, but it encodes each input picture independently from other input pictures and decodes each coded picture independently from other coded pictures. It needs to be understood that whenever a video codec, video encoding or encoder, or video decoder or decoding is referred below, the text similarly applies to an image codec, image encoding or encoder, or image decoder or decoding, respectively.

A picture given as an input to an encoder may also referred to as a source picture, and a picture decoded by a decoded may be referred to as a decoded picture. The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

The term "pixel" may refer to the set of spatially collocating samples of the sample arrays of the color components. Sometimes, depending on the context, the term "pixel" may refer to a sample of one sample array only.

In the following, these arrays may be referred to as luma (or L or Y) and chroma, where the two chroma arrays may be referred to as Cb and Cr; regardless of the actual color representation method in use. The actual color representation method in use can be indicated e.g. in a coded video bitstream. A component may be defined as an array or single sample from one of the three sample arrays arrays (luma and two chroma) or the array or a single sample of the array that compose a picture in monochrome format.

In some coding systems, a picture may either be a frame or a field, while in some coding systems a picture may be constrained to be a frame. A frame comprises a matrix of luma samples and possibly the corresponding chroma samples. A field is a set of alternate sample rows of a frame and may be used as encoder input, when the source signal is interlaced.

Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

Spatial resolution of a picture may be defined as the number of pixels or samples representing the picture in horizontal and vertical direction. Alternatively, depending on the context, spatial resolution of a first picture may be defined to be the same as that of a second picture, when their sampling grids are the same, i.e. the same sampling interval is used both in the first picture and in the second picture. The latter definition may be applied for example when the first picture and the second picture cover different parts of a picture. For example, a region of a picture may be defined to have a first resolution when the first region comprises a first number of pixels or samples. The same region may be defined to have a second resolution when the region comprises a second number of pixels. Hence, resolution can be defined as the number of pixels with respect to the area covered by the pixels, or, by pixels per degree.

In some coding arrangements luma and chroma sample arrays are coded in an interleaved manner, e.g. interleaved block-wise. In some coding arrangements, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

Video encoders may encode the video information in two phases.

Firstly, pixel values in a certain picture area (or "block") are predicted. The prediction may be performed for example by motion compensation means (finding and indicating an area in one of the previously coded video frames that corresponds closely to the block being coded), which may be referred to as inter prediction or inter-picture prediction. Alternatively or in addition, the prediction may be performed for example by spatial means (using the pixel values around the block to be coded in a specified manner), which may be referred to as intra prediction or spatial prediction. In some coding arrangements, prediction may be absent or the prediction signal may be pre-defined (e.g. a zero-valued block).

Secondly, the prediction error, i.e. the difference between the predicted block of pixels and the original block of pixels, is coded. This may done for example by transforming the difference in pixel values using a specified transform (e.g. Discrete Cosine Transform (DCT) or a variant of it), quantizing the coefficients and entropy coding the quantized coefficients. The fidelity of the quantization process can be controlled through the quantization step size, which is controlled in many codecs by the so-called quantization parameter (QP). By varying the fidelity of the quantization process, the encoder can control the balance between the accuracy of the pixel representation (picture quality) and size of the resulting coded video representation (file size or transmission bitrate). In another example, the pixel values are coded without transforming them for example using differential pulse code modulation and entropy coding, such as Huffman coding or arithmetic coding.

Figure 4:
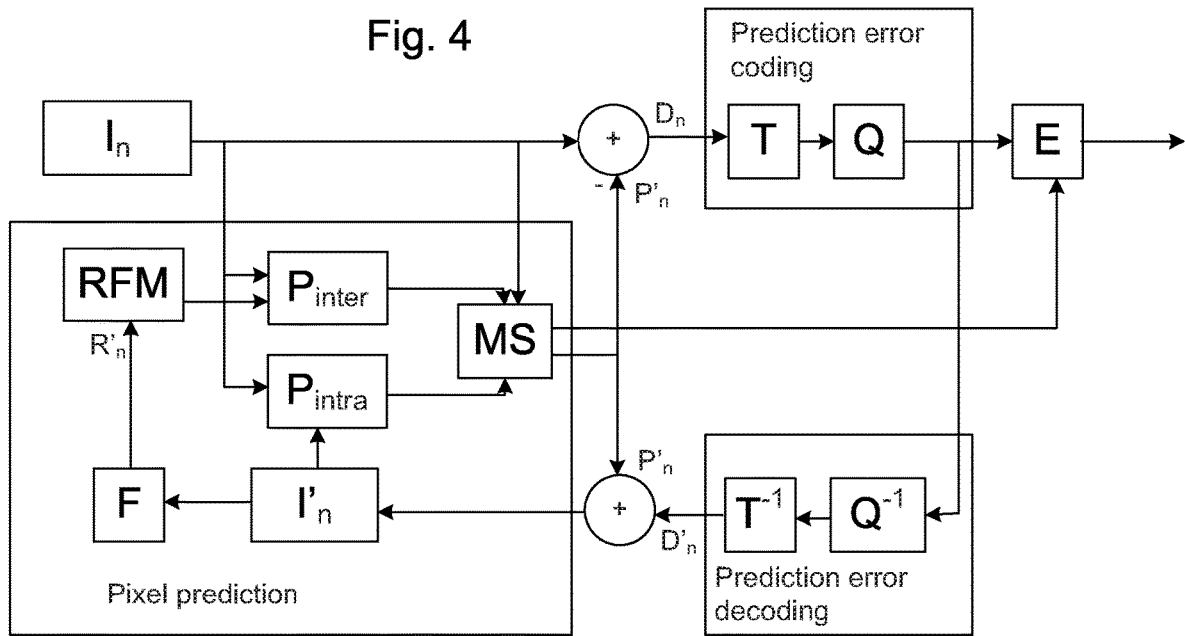
FIG. 4 shows an encoder according to an embodiment.
Figure 5:
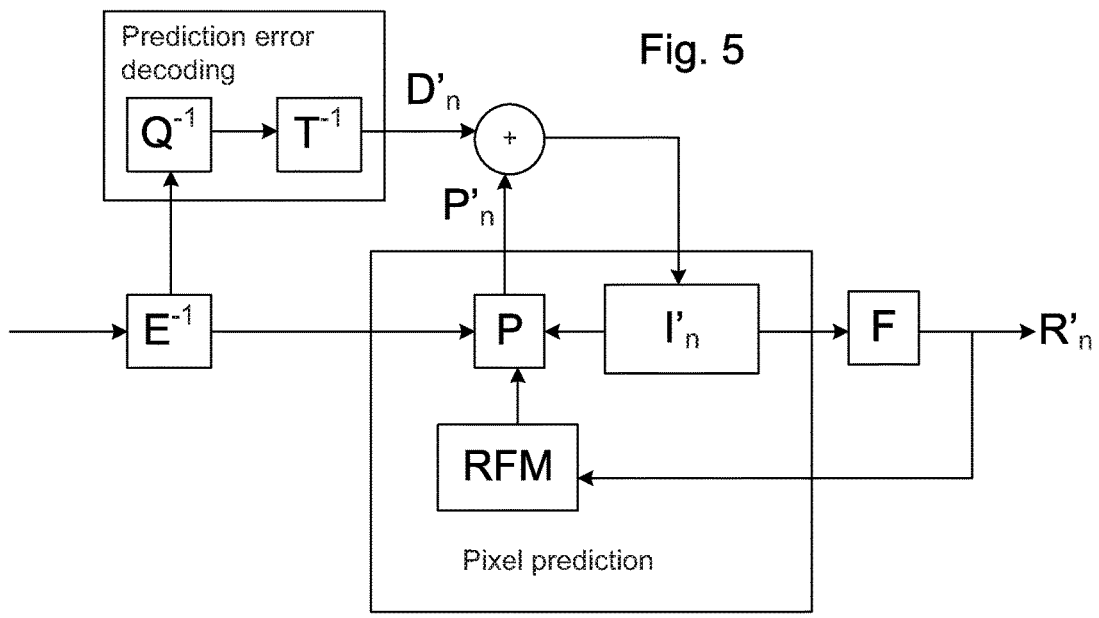
FIG. 5 shows a decoder according to an embodiment.

An example of an encoding process is illustrated in FIG. 4. FIG. 4 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F). An example of a decoding process is illustrated in FIG. 5. FIG. 5 illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

The term "layer" may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

The Advanced Video Coding standard (which may be abbreviated AVC or H.264/AVC) was developed by the Joint Video Team (JVT) of the Video Coding Experts Group (VCEG) of the Telecommunications Standardization Sector of the International Telecommunication Union (ITU-T) and the Moving Picture Experts Group (MPEG) of International Organisation for Standardization (ISO) International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of the invention are not limited to H.264/AVC or HEVC or their extensions, but rather the description is given for one possible basis on top of which the invention may be partly or fully realized.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures.

A NAL unit may be defined as a syntax structure containing an indication of the type of data to follow and bytes containing that data in the form of a Raw Byte Sequence Payload RBSP interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units can be categorized into Video Coding Layer (VCL) NAL units and non-VCL NAL units. VCL NAL units comprise coded sample data. A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by VCL NAL units of one or more coded pictures.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined.

Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format). A track may be regarded as a logical channel. For video tracks, a media sample may correspond to a coded picture or an access unit.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derive from generic classes (e.g. VisualSampleEntry, AudioSampleEntry). Which type of sample entry form is used for derivation the track-type specific sample entry format is determined by the media handler of the track.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A media segment may comprise one or more self-contained movie fragments. A media segment may be used for delivery, such as streaming, e.g. in MPEG-DASH.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). MPEG DASH and 3GPP-DASH are technically close to each other and may therefore be collectively referred to as DASH.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum media bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods; each Period contains one or more Groups; each Group contains one or more Adaptation Sets; each Adaptation Sets contains one or more Representations; each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attribute as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, e.g. ImportantElement. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute. To point to a specific attribute @attribute contained in an element Element, one may write Element@attribute. If an attribute's name consists of two or more combined words, camel-casing may be used after the first word, e.g. @veryImportantAttribute. Attributes may have assigned a status in the XML as mandatory (M), optional (O), optional with default value (OD) and conditionally mandatory (CM).

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other levell elements and padding. A Segment Index of DASH may comprise a Cues Element of Matroska.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Figure 6:
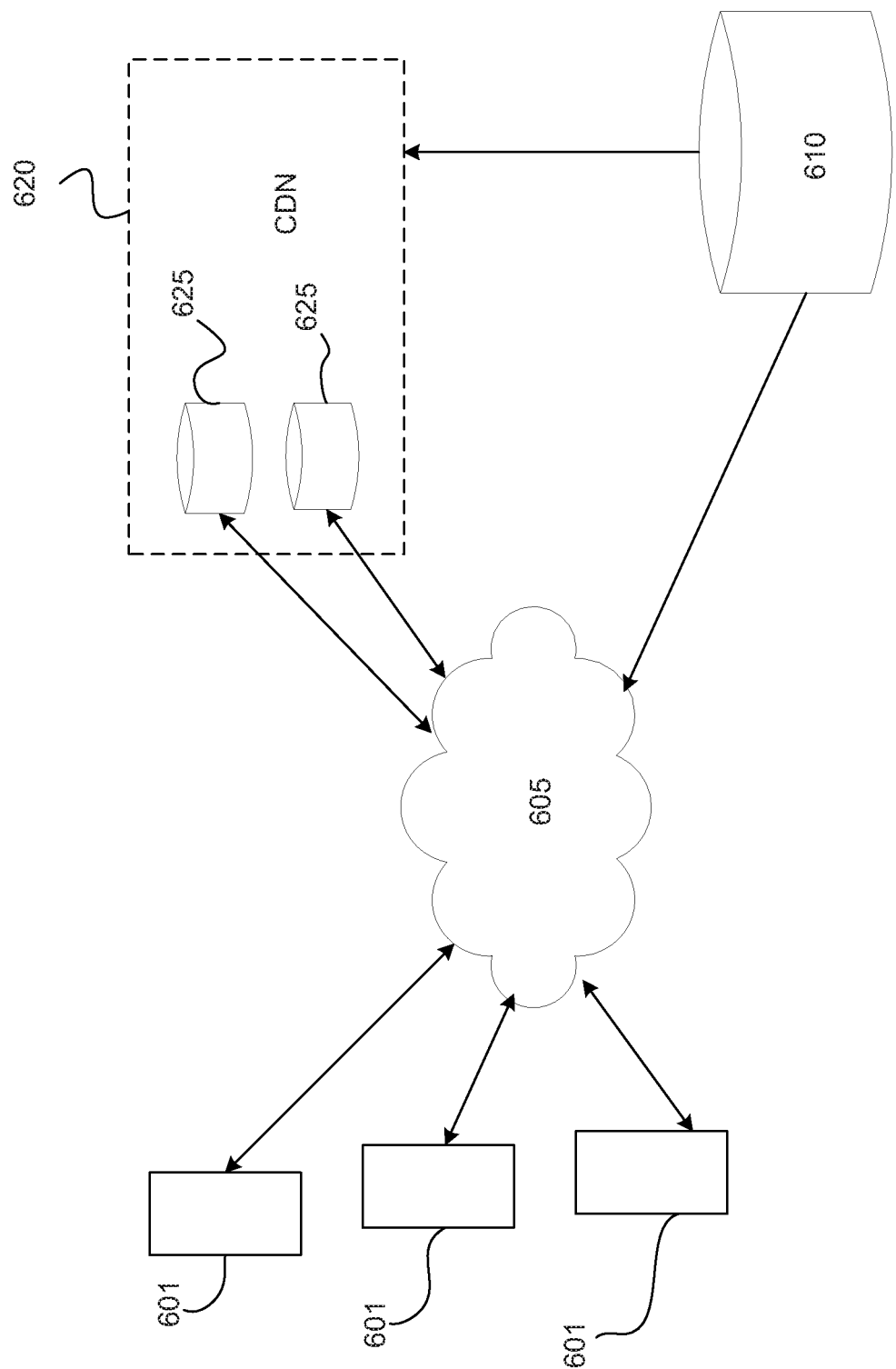
FIG. 6 shows an example of an end-to-end DASH system.

A simplified illustration of an end-to-end DASH system is shown in FIG. 6. An end-to-end DASH system may be comprised as follows. The media content is provided by an origin server 610, which is typically a conventional web (HTTP) server. The origin server 610 may be connected with a Content Delivery Network (CDN) 620 over which the streamed content is delivered to and stored in edge servers 625. The MPD allows signaling of multiple base URLs for the content, which can be used to announce the availability of the content in different edge servers 625. Alternatively, the content server 610 may be directly connected to the Internet 605. Web proxies may reside on the path of routing the HTTP traffic between the DASH clients 601 and the origin 610 or edge server 625 from which the content is requested. Web proxies may cache HTTP messages and hence can serve clients' 601 requests with the cached content. They are commonly used by network service providers, since they reduce the required network bandwidth from the proxy towards origin 610 or edge servers 625. For end-users 601 HTTP caching provides shorter latency. DASH clients 601 may be connected to the Internet 605 through an access network, such as a mobile cellular network.

In DASH the automated selection between Representations in the same Adaptation Set have been performed based on the width and height (@width and @height); the frame rate (@frameRate); the bitrate (@bandwidth); indicated quality ordering between the Representations (@qualityRanking). The semantics of @qualityRanking are specified as follows: specifies a quality ranking of the Representation relative to other Representations in the same Adaptation Set. Lower values represent higher quality content. If not present, then no ranking is defined.

In the present application, the terms "360-degree video" or "virtual reality (VR) video" or "omnidirectional video" may be used interchangeably. The terms generally refer to video content that provides such a large field of view that only a part of the video is displayed at a single point of time in typical displaying arrangements. For example, VR video may be viewed on a head-mounted display (HMD) (as the one shown in FIG. 3) that may be capable of displaying e.g. about 100-degree field of view. The spatial subset of the VR video content to be displayed may be selected based on the orientation of the HMD. In a conventional flat-panel viewing environment, which represents another example of the viewing environment, e.g. up to 40-degree field of view may be displayed. When displaying wide field of view content (e.g., fisheye) on such flat-panel display, a spatial subset of the picture may be displayed instead of the entire picture. In such example, the displayed spatial subset of the VR video content may be selected based on the orientation of the device used for the viewing, or the device may enable content panning, e.g., by providing basic user interface (UI) controls for the user.

Video interface that may be used by the head mounted displays is HMDI, a serial interface where the video information in transmitted in three TMDS (Transition Minimized Differential Signaling) channels (RGB, YCbCr) as Video Data Periods. in another video interface, superMHL, there are more (6 to 8) TMDS channels, which can be used in a more flexible way to transmit video and other data, the main difference being that MHL transmits RGB (or YCbCr) information of a pixel sequentially over the one TMDS channel.

A transmission channel or a communication channel or a channel may refer to either a physical transmission medium, such as a wire, or to a logical connection over a multiplexed medium. Examples of channels comprise lanes in video interface cables and a Real-Time Transport Protocol (RTP) stream.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A 360-degree image or video content may be acquired and prepared for example as follows. Images or video can be captured by a set of cameras or a camera device with multiple lenses and sensors. The acquisition results in a set of digital image/video signals. The cameras/lenses may cover all directions around the center point of the camera set or the camera device. The images of the same time instance are stitched, projected, and mapped onto a packed VR frame.

Figure 7:
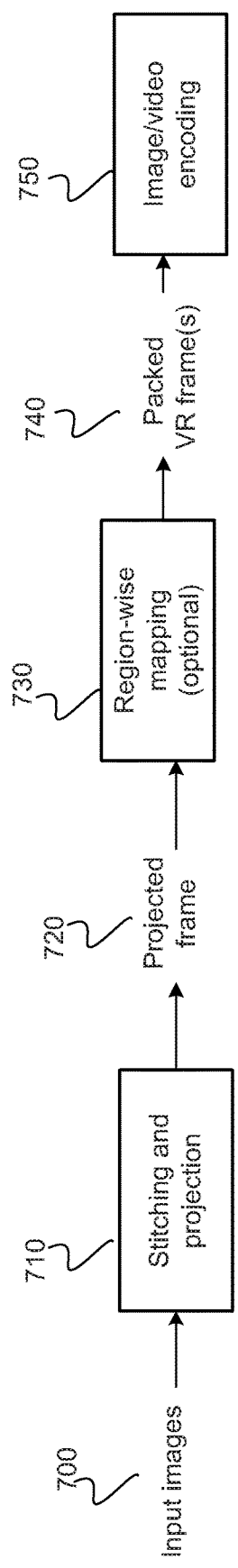
FIG. 7 shows an example of preparation of 360-degree image/video content.

FIG. 7 illustrates an example of such process. At first, input images 700 are obtained from a camera device. These input images are stitched and projected 710 onto a three-dimensional projection structure, such as a sphere or a cube. The projection structure may be considered to comprise one or more surfaces, such as plane(s) or part(s) thereof. The projection structure may be defined as three-dimensional structure consisting of one or more surface(s) on which the captured VR image/video content is projected, and from which a respective projected frame can be formed. The image data on the projection structure is further arranged onto a two-dimensional projected frame 720 (a.k.a. projected picture). The term "projection" (a.k.a. omnidirectional projection) may be defined as a process by which a set of input images are projected onto a projected frame. There may be a pre-defined set of representation formats of the projected frame, including for example an equirectangular projection (ERP, a.k.a. equirectangular panorama) and a cube map (CMP) representation format.

Region-wise mapping 730 (a.k.a. region-wise packing) may optionally be applied to map projected frame onto one or more packed VR frames 740 (a.k.a. packed picture or packed frame). In some cases, region-wise mapping is understood to be equivalent to extracting two or more regions from the projected frame, optionally applying a geometric transformation (such as rotating, mirroring, and/or resampling) to the regions, and placing the transformed regions in spatially non-overlapping areas, a.k.a. constituent frame partitions, within the packed VR frame. If the region-wise mapping is not applied, the packed VR frame is identical to the projected frame. Otherwise, regions of the projected frame are mapped onto a packed VR frame by indicating the location, shape, and size of each region in the packed VR frame. The term mapping may be defined as a process by which a projected frame is mapped to a packed VR frame. The term packed VR frame may be defined as a frame that results from a mapping of a projected frame. In practice, the input images may be converted to a packed VR frame in one process without intermediate steps. The packed VR frame(s) are then provided for image/video encoding 750.

Figure 8:
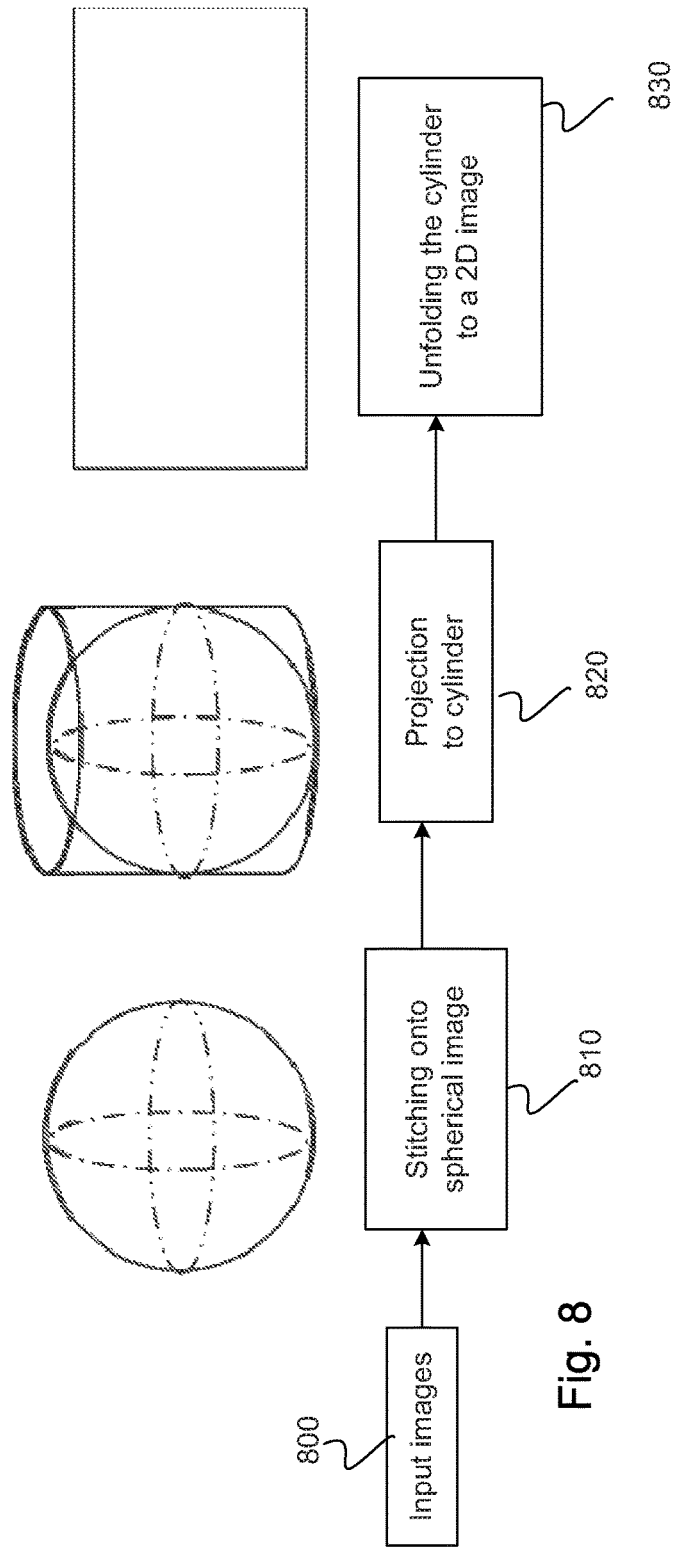
FIG. 8 shows an example of a process of forming a monoscopic equirectangular panorama picture.

360-degree panoramic content (i.e., images and video) cover horizontally the full 360-degree field of view around the capturing position of a camera device. The vertical field of view may vary and can be e.g., 180 degrees. Panoramic image covering 360-degree field of view horizontally and 180-degree field of view vertically can be represented by a sphere that has been mapped to a two-dimensional image plane using equirectangular projection. In this case, the horizontal coordinate may be considered equivalent to a longitude, and the vertical coordinate may be considered equivalent to latitude, with no transformation or scaling applied. The process of forming a monoscopic equirectangular panorama picture is illustrated in the FIG. 8. A set of input images 800, such as fisheye images of a camera array or from a camera device with multiple lenses and sensors, is cross blended or stitched 810 onto a spherical image (equidistant projection). The spherical image is further projected onto a cylinder 820 (without the top and bottom faces). The cylinder is unfolded to form a two-dimensional projected frame 830. In practice one or more of the presented steps may be merged; for example, the input images may be directly projected onto a cylinder without an intermediate projection onto a sphere. The projection structure for equirectangular panorama may be considered to be a cylinder that comprises a single surface. Similarly, stereoscopic equirectangular panorama pictures can be formed from a set of input images for the left and right eyes. In stereoscopic equirectangular panoramas the upper part of the panorama may be the left-eye images, and the lower part of the panorama may be the right-eye image.

The equirectangular projection may be defined as a process that converts any sample location within the projected picture (of the equirectangular projection format) to angular coordinates of a coordinate system. The sample location within the projected picture may be defined relative to pictureWidth and pictureHeight, which are the width and height, respectively, of the equirectangular panorama picture in samples. In the following, let the center point of a sample location along horizontal and vertical axes be denoted as i and j, respectively. The angular coordinates ($\phi$, $\theta$) for the sample location, in degrees, are given by the following equirectangular mapping equations: $\phi=(i\div pictureWidth-0.5)*360$, $\theta=(0.5-j\div pictureHeight)*180$.

In general, 360-degree content can be mapped onto different types of solid geometrical structures, such as polyhedron (i.e., a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto sphere first), cone, etc. and then unwrapped to a two-dimensional image plane.

In some cases panoramic content with 360-degree horizontal field of view but with less than 180-degree vertical field of view may be considered special cases of equirectangular projection, where the polar areas of the sphere have not been mapped onto the two-dimensional image plane. In some cases a panoramic image may have less than 360-degree horizontal field of view and up to 180-degree vertical field of view, while otherwise has the characteristics of equirectangular projection format.

A sphere region may be defined as a region on a sphere, which may be further constrained by the means to specify the sphere region, which may include but might not be limited to specifying the region either by four great circles or by two yaw circles and two pitch circles. A great circle may be defined as an intersection of the sphere and a plane that passes through the center point of the sphere. A great circle is also known as an orthodrome or Riemannian circle. The center of the sphere and the center of a great circle are co-located. A pitch circle may be defined as a circle on the sphere connecting all points with the same pitch value. A yaw circle may be defined as a circle on the sphere connecting all points with the same yaw value. A sphere region may further require a point within the region, such as the center point of the region, to make it distinct from another sphere region that would otherwise be defined with the same parameters (e.g., the same great circles).

A quality ranking region may be defined as a region that is associated with a quality ranking value and is specified relative to a decoded picture or a sphere. A 2D region may be defined as a region on a decoded picture, where the region may be further constrained to be rectangular. A quality ranking 2D region may be defined as a quality ranking region that is specified relative to a decoded picture. A quality ranking sphere region may be defined as a quality ranking region that is specified relative to a sphere.

In 360-degree systems, a coordinate system may be defined through orthogonal coordinate axes X (lateral), Y (vertical, pointing upwards), and Z (back-to-front axis, pointing outwards) that may be used for defining yaw ($\phi$), pitch ($\theta$), and roll angles. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis.

Global coordinate axes may be defined as coordinate axes, e.g. according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located. In the absence of the initial viewpoint metadata, the playback may be recommended to be started using the orientation (0, 0, 0) in (yaw, pitch, roll) relative to the global coordinate axes.

The human eyes are not capable of viewing the whole 360-degree space, but are limited to a maximum horizontal and vertical Field of Views (FoVs, Human eye Horizontal FoV (HHFoV); Human eye Vertical FoV (HVFov)). Also, a HMD device has technical limitations that allow only viewing a subset of the whole 360 degrees spaces in horizontal and vertical directions (Device Horizontal FoV (DHFoV); Device Vertical FoV (DVFoV)).

At any point of time, a video rendered by an application on a HMD renders a portion of the 360 degrees video. This portion if defined in this application as "viewport". A viewport is a window on the 360-degree world represented in the omnidirectional video displayed via a rendering display. A viewport is characterized by horizontal and vertical FoVs (Viewport Horizontal FoV (VHFoV); Viewport Vertical FoV (VVFoV)). In the following, VHFoV and VVFoV will be simply abbreviated with HFoV and VFoV.

A viewport size may correspond to the HMD FoV, or may have smaller or larger size, depending on the application. For the sake of clarity, the part of the 360 degrees space viewed by a user at any given point of time is referred as a "primary viewport".

One method to reduce the streaming bitrate of VR video is viewport adaptive streaming (a.k.a. viewport dependent delivery). In such streaming a subset of 360-degree video content covering the primary viewport (i.e., the current view orientation) is transmitted at the best quality/resolution, while the remaining of 360-degree video is transmitted at a lower quality/resolution. There are generally two approaches for viewport-adaptive streaming:

1) Viewport-specific encoding and streaming, a.k.a. viewport-dependent encoding and streaming, a.k.a. asymmetric projection, a.k.a. packed VR video. In this approach, 360-degree image content is packed into the same frame with an emphasis (e.g., greater spatial area) on the primary viewport. The packed VR frames are encoded into a single bitstream. For example, the front face of a cube map may be sampled with a higher resolution compared to other cube faces, and the cube faces may be mapped to the same packed VR frame as shown in FIG. 9.

2) VR viewport video, a.k.a. tile-based encoding and streaming. In this approach, 360-degree content is encoded and made available in a manner that enables selective streaming of viewports from different encodings. For example, each cube face may be separately encoded. More than one encoded bitstream for each cube face may be provided, e.g. each with different spatial resolution. Players can choose bitstreams to be decoded and played based on the current viewing orientation. High-resolution bitstreams may be selected for the cube faces used for rendering for the present viewing orientation, while the remaining cube faces may be obtained from their low-resolution bitstreams. In another example, equirectangular panorama content is encoded using motion-constrained tile sets. More than one encoded bitstream may be provided, e.g. with different spatial resolution and/or picture quality. Each motion-constrained tile set is made available in its own bitstream. Players can choose bitstreams to be to be decoded and played based on the current viewing orientation. High-resolution or high-quality bitstreams may be selected for tile sets covering the present primary viewport, while the remaining area of the 360-degree content may be obtained from low-resolution or low-quality bitstreams.

It is possible to combine the approaches 1) and 2) above.

The 360 degrees space can be assumed to be divided into a discrete set of viewports, each separated by a given distance (e.g., expressed in degrees), so that the omnidirectional space can be imagined as a map of overlapping viewports, and the primary viewport is switched discretely as the user changes his/her orientation while watching content with a HMD. When the overlapping between viewports is reduced to zero, the viewports could be imagined as adjacent non-overlapping tiles within the 360 degrees space. The H.265 video codec is configured to implement the concept of tiles which may be used to realize such scenario (both overlapping or not).

In VR domain, a video signal is defined as monoscopic, when the same signal is rendered to both the eyes via a HMD. A video signal is defined as stereoscopic, when it can create the effect of stereopsis (i.e. the perception of depth) through binocular vision with both eyes. This is achieved through binocular disparity between the eyes, i.e. a given distance between the eyes allows the perception of depth. A stereoscopic signal is made of two data streams: one viewed by the left eye, and another viewed by the right eye. The difference between these streams is given by binocular disparity as mentioned above.

The Human Visual System (HVS) shows interesting properties, upon which a stereoscopic video signal rendered at different qualities (up to a certain limit) to the left and right eyes, are perceived as if they were both at the highest of the left and right quality. In this sense, the HVS applies a masking filter with respect to the low quality image.

Despite some properties of the HVS are known for several decades, the reaction of the HVS on stereoscopic video that uses several types of unequality during video rendering on a HMD has not been completely investigated, and still remains an open research field.

Preliminary research investigations have shown that unequal quality between views could be used in a digital 360-degree video streaming system for the purpose of reducing the required bandwidth of such a system, while at the same time ensuring for the purpose of reducing the required bandwidth of such a system, while at the same time ensuring that the perceived video quality does not decrease (due to the perceived quality being close to the quality of the higher-quality view).

The delivery of 360-degree stereo video is characterized by several parameters, which are discussed in more detailed manner below. These parameters play important roles, and can be utilized for unequal stereoscopic 360-degree video streaming delivery with the goal of reducing the streaming bandwidth requirements.

Recently, MPEG (Motion Picture Experts Group) has been working on defining the first standard of Omnidirectional Media Format (OMAF), where stereoscopic video can be used. Currently, there are no mechanisms in the standard to indicate the carriage of unequal 360-degree video, or its specification is not sufficient. The present embodiments are targeted to fill this gap and to define a set of parameters that are needed to allow the streaming of unequal 360-degree video in MPEG OMAF or similar systems.

While properties of video bitstream can be signalled by various means, such as Video Usability Information (VUI) and/or Supplemental Enhancement Information (SEI), within the bitstream, such signalling cannot be used to indicate different properties for different sphere regions of 360-degree video.

In most today's streaming systems, such as MPEG-DASH, a streaming client selects a content piece, such as a Representation of MPEG-DASH, based on the content properties indicated in a streaming manifest or presentation description. Similarly, if a multimedia file contains multiple alternative bitstreams of the media content, a video player selects the most suitable bitstream for its use based on the properties indicated in the multimedia file.

It is asserted that in 360-degree video playback, the content selection can be based on a variety of factors. One of the possible factors is viewport-dependent content selection, where the content that provides higher quality for the currently visible viewport may be selected, while the properties of non-visible areas may be compromised e.g. to have smaller processing complexity. The other of the possible factors is display-dependent and/or user preference based limits on unequality between left and right view properties.

In HEVC, a regional nesting SEI message provides a mechanism to associate SEI messages with regions of the picture. The associated SEI messages are conveyed within the regional nesting SEI message. A regional nesting SEI message contains one or more SEI messages. When an SEI message is contained in a regional nesting SEI message, the contained SEI message is referred to as a region-nested SEI message. For each region-nested SEI message in a regional nesting SEI message, one or more regions are specified in the regional nesting SEI message, and the semantics of the region-nested SEI message are to be interpreted as applying to each of these regions.

Thus, the mechanism allows to specify different properties for different regions of pictures.

Unequality in a 360-degree video can be achieved via a variety of methods, as listed below. All methods aim at keeping the visual quality constant, and having the gain of a reduced bandwidth requirement for transmission (e.g., streaming) and/or storage of stereoscopic 360-degree video.

In SNR (Signal-to-Noise Ratio) unequality, one view is transmitted and rendered at high SNR quality (e.g. using a lower QP), whereas the other view is transmitted and rendered at lower SNR quality (i.e. using a higher QP).

In spatial unequality, one view is transmitted and rendered at a higher spatial resolution, whereas the other view is transmitted and rendered at a lower spatial resolution.

In temporal unequality, one view is transmitted and rendered at higher temporal resolution (i.e. at higher frame rate), whereas the other view is transmitted and rendered at lower temporal resolution (i.e. at a lower frame rate).

In FOV unequality, one view is transmitted and rendered with a larger horizontal and/or vertical FOV, whereas the other view is transmitted and rendered with a narrower horizontal and/or vertical FOV.

In bit-depth unequality, on one eye is transmitted and rendered a video stream encoded with a higher bit-depth, whereas on the other eye is transmitted and rendered a video stream encoded with a lower bit-depth. More generally, the value ranges for representing sample values may differ between views. For example, sample values of one view may be scaled to be within the range 0 to 767, inclusive, and sample values of the other view may be in the range of 0 to 1023, inclusive, while both views use 10-bit bit-depth, and the extreme values of the two value ranges may correspond to the same colors.

In chroma format unequality, views have different chroma formats, e.g. one view has chroma format 4:2:0 and the other view has chroma format 4:4:4.

In color gamut unequality, the views have different color gamuts, e.g. one view uses the BT.709 color gamut, while the other uses BT.2020 color gamut.

A combination of the above methods is also possible.

The present solution includes the definition of a set of indicators (e.g. in the form of parameters or flags) to indicate the use of one or more of the unequality methods above during the transmission of a stereoscopic video stream. This set of indicators is described in more detailed manner in the following:

If SNR unequality indicator is flagged to 1, it indicates that one of the views is carried at higher SNR quality, and the other view is carried at lower SNR quality. In addition, a field describing what view is at higher quality is indicated (Left or Right).

If spatial unequality indicator is flagged to 1, it indicates that one of the views is carried at higher spatial resolution, and the other view is carried at lower spatial resolution. In addition, a field describing what view is at higher spatial resolution is indicated (Left or Right). Optionally, two fields associated to left and right spatial resolutions (i.e., the spatial resolutions) can be indicated and can contain the actual spatial resolution values for the two views expressed in a suitable unit.

If temporal unequality indicator is flagged to 1, it indicates that one of the views is carried at higher temporal resolution, and the other view is carried at lower temporal resolution. In addition, a field describing what view is at higher temporal resolution is indicated (Left or Right). Optionally, two fields associated to left and right temporal resolutions (i.e., the frame rates) can be indicated and contain the actual temporal resolution values for the two view expressed in a suitable units.

If FOV unequality indicator is flagged to 1, it indicates that one of the views is carried with a wider horizontal and/or vertical FOV, and the other view is carried with a narrower horizontal and/or vertical FOV. In addition, a field describing what view is using a wider horizontal and/or vertical FOV is indicated (Left or Right). Additionally, two fields associated to left and right views FOVs could be indicated and contain each one the horizontal and the vertical FOVs expressed in a suitable unit.

If bit-depth unequality indicator is flagged to 1, it indicates that one of the views is carried with a higher bit-depth, and the other view is carried with a lower bit-depth. In addition, a field describing what view is using a higher bit depth is indicated (Left or Right). Additionally, two fields associated to left and right views could be indicated and contain each one the bit-depth values of the respective views expressed in a suitable unit.

If sample value range unequality indicator is flagged to 1, it indicates that sample values of one view use a different value range than sample values of the other view.

If chroma format unequality indicator is flagged to 1, it indicates that views have different chroma formats, e.g. one view has chroma format 4:2:0 and the other view has chroma format 4:4:4. Additionally, two fields associated to left and right views could be indicated and contain each one the chroma format value of the respective views expressed in a suitable unit.

If a color gamut unequality indicator is flagged to 1, the views have different color gamuts, e.g. one view uses the BT.709 color gamut, while the other uses BT.2020 color gamut. Additionally, two fields associated to left and right views could be indicated and contain each one the color gamut value of the respective views expressed in a suitable unit.

These indicators can be applied at different levels. For example, indicators can be applied to a whole picture (e.g. a panorama 360-degree picture). Instead, indicators can be applied to a sub-picture (e.g. a region smaller than the whole picture, for example, a tile representing a limited vertical and horizontal FOV). In an embodiment, the parameters are indicated for one or more sphere regions. The sphere regions may correspond to a subset of the content coverage on the sphere.

The parameters can be embedded as a part of an elementary video bitstream (e.g., as an SEI message or VUI) and/or as a part of the file format (e.g., ISO base media file format) and/or transmitted via a transport protocol (e.g., incorporated in an MPD of the MPEG DASH protocol), or in general transmitted from a source entity (client or server) to a destination entity (client) via any protocol at any of the ISO OSI layers.

Examples of implementation in MPEG ISOBMFF and possible usage in MPEG OMAF:

The following syntax and semantics append the SphereRegionQualityRankingBox of OMAF. Similar extension can also be specified for the 2DRegionQualityRankingBox of OMAF. These boxes may reside in the sample entry.

```
aligned(8) class SphereRegionQualityRankingBox extends FullBox('srqr',
0, 0) {
    unsigned int(8) region_definition_type;
    unsigned int(8) num_regions;
    unsigned int(12) unequality_indicator_mask;
    unsigned int(1) remaining_area_flag;
    unsigned int(1) view_idc_present_flag;
    if (view_idc_present_flag)
        bit(2) reserved = 0;
    else
        unsigned int(2) default_view_idc;
    for (i = 0; i < num_regions; i++) {
        unsigned int(8) quality_ranking;
        if (view_idc_present_flag) {
            unsigned int(2) view_idc;
            bit(6) reserved = 0;
        }
        if (i < num_regions - 1 || remaining_area_flag == 0)
            SphereRegionStruct(1);
    }
}
```

Above syntax elements, despite the element "unequality_indicator_mask", are identical or similar to those specified in OMAF presently.

region_definition_type equal to 0 specifies that the sphere region is specified by four great circles. region_definition_type equal to 1 specifies that the sphere region is specified by two yaw circles and two pitch circles. Other values of region_definition_type are reserved.

num_regions specifies the number of quality ranking regions for which the quality ranking information is given in this box.

remaining_area_flag equal to 0 specifies that all the quality ranking regions are defined by the SphereRegionStruct(1) structures. remaining_area_flag equal to 1 specifies that the first num_regions−1 quality ranking regions are defined by SphereRegionStruct(1) structure and the last remaining quality ranking region is the sphere region within coverage area, not covered by the union of the quality ranking regions defined by the first num_regions−1 SphereRegionStruct(1) structures.

SphereRegionStruct(1) specifies the spherical location and size of the quality ranking region relative to the global coordinate axes, while the shape of the quality ranking regions is indicated by region_definition_type.

```
The syntax of SphereRegionStruct may be specified as follows:
    aligned(8) SphereRegionStruct(range_included_flag) {
        signed int(32) center_yaw;
        signed int(32) center_pitch;
        singed int(32) center_roll;
        if (range_included_flag) {
            unsigned int(32) hor_range;
            unsigned int(32) ver_range;
        }
        unsigned int(1) interpolate;
        bit(7) reserved = 0;
    }
``` center_yaw, center_pitch, and center_roll specify the orientation of the sphere region in units of $2^{-16}$ degrees relative to the global coordinate axes. center_yaw and center_pitch indicate the center of the sphere region, and center_roll indicates the roll angle of the sphere region.

hor_range and ver_range, when present, specify the horizontal and vertical ranges, respectively, of the sphere region specified by this sample in units of $2^{-16}$ degrees. hor_range and ver_range specify the range through the center point of the sphere region.

For quality ranking regions, interpolate may be required to be equal to 0.

view_idc_presence_flag equal to 0 specifies that view_idc is not present. view_idc_presence_flag equal to 1 specifies that view_idc is present and indicates the association of quality ranking region with particular (left or right or both) views or monoscopic content.

default_view_idc equal to 0 indicates that the quality ranking region is monoscopic, 1 indicates that the quality ranking region is on the left view of stereoscopic content, 2 indicates that the quality ranking region is on the right view of stereoscopic content, 3 indicates that the quality ranking region is on both the left and right views.

quality_ranking specifies a quality ranking value of the quality ranking region. quality_ranking equal to 0 indicates that the quality ranking value is not defined. Non-zero quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region is approximately constant.

view_idc equal to 0 indicates that the quality ranking region is monoscopic, 1 indicates that the quality ranking region is on the left view of stereoscopic content, 2 indicates that the quality ranking region is on the right view of stereoscopic content, 3 indicates that the quality ranking region is on both the left and right views. When not present, the value of view_idc is inferred to be equal to the value of default_view_idc.

The syntax element unequality_indicator_mask is specified for the purposes of the present solution.

Each bit position in the unequality_indicator_mask may correspond to an unequality indicator, as described above. For example, bit position 0 may correspond to the SNR unequality indicator, bit position 1 may correspond to the spatial unequality indicator, bit position 2 may correspond to temporal unequality indicator, and so on. It is appreciated that any other order of the indicators is also possible.

When the value of unequality_indicator_mask is non-zero and the quality_ranking values differ between views and/or regions, the bit positions that have a bit equal to 1 within the unequality_indicator_mask indicate the types of unequality that has been applied.

Another example appends the StereoVideoBox of ISO base media file format, whose syntax is presently the following:

```
aligned(8) class StereoVideoBox extends extends FullBox('stvi', version = 0, 0)
{
    template unsigned int(30) reserved = 0;
    unsigned int(2) single_view_allowed;
    unsigned int(32)   stereo_scheme;
    unsigned int(32)   length;
    unsigned int(8)[length] stereo_indication_type;
    Box[ ] any_box; // optional
}
```

According to the example embodiment, a new box, e.g. named UnequalityIndicatorBox, is specified to be contained within the StereoVideoBox and to contain information on the type of unequality between views. For example, the syntax of UnequalityIndicatorBox may be specified as follows:

```
aligned(8) class UnequalityIndicatorBox extends extends FullBox('uneq', version = 0, 0)
{
    unsigned int(16) unequality_indicator_mask;
}
```

The semantics of unequality_indicator_mask that was discussed above may be applied also here. This means that when the value of unequality_indicator_mask is non-zero, the bit positions that have a bit equal to 1 within the unequality_indicator_mask indicate the types of unequality that has been applied.

According to an embodiment, UnequalityIndicatorBox may include additional properties characterizing the unequality between views, for example to indicate which view is of higher subjective quality. Alternatively, there may be indicating values characterizing the quality difference. These values may be specific to the type of unequality and may be conditionally present only if the corresponding unequality is indicated. For example, for SNR unequality, an average or approximate peak SNR difference between views may be indicated and/or an average quantization parameter value difference between views may be indicated.

Next, examples of implementation in MPEG DASH and possible usage in MPEG OMAF are given:

The indicators of the region-wise quality ranking (RWQR) descriptor for DASH are presently specified as follows in the OMAF specification:

| @value parameter for RWQR descriptor | Use | Description |
|---|---|---|
| shape_type | M | Value 0 specifies that the region is indicated through four great rectangles. Value 1 specifies that the region is indicated through two yaw and two pitch circles. |
| quality_ranking | M | Specifies a quality ranking of the region. quality_ranking equal to 0 indicates that the quality ranking is not defined. When region A has a non-zero quality_ranking value smaller than the quality_ranking value of region B, region A has a higher quality than region B. |
| view_idc | M | 0 indicates that the content is monoscopic, 1 indicates that the region is on the left view of stereoscopic content, 2 indicates that the region is on the right view of stereoscopic content, 3 indicates that the region is on both the left and right views. |
| remaining_area_flag | M | Value 0 specifies that center_yaw, center_pitch, center_roll, hor_range, and ver_range are present. Value 1 specifies that the region is the area not covered by any other regions defined by RWQR descriptors included in the same element. remaining_area_flag is not equal to 1 in more than one RWQR descriptor in the same element. |
| center_yaw | CM | Specifies the yaw of the center point the region in degrees relative to the global coordinate axes. |
| center_pitch | CM | Specifies the pitch of the center point the region in degrees relative to the global coordinate axes. |
| center_roll | CM | Specifies the roll angle for the region. |
| hor_range | CM | Specifies the horizontal range of the region through the center point of the region. |
| ver_range | CM | Specifies the vertical range of the region through the center point of the region. |

According to an embodiment, the RWQR descriptor is appended with the following:

| unequality_indicator_mask | O | Each bit position in the unequality_indicator_mask corresponds to an unequaility indicator, as described above. For example, bit position 0 may correspond to the SNR unequality indicator, bit position 1 may correspond to the spatial unequality indicator, and so on. |
|---|---|---|

In an embodiment, the above-described unequality indicators may apply between sphere regions and/or 2D regions in addition to or instead of applying between views. For example, when sphere region A and sphere region B of the same view are associated with SNR unequality indicator, sphere region A and sphere region B have different SNR. Similarly, when 2D regions A and B of the same view are associated with spatial unequality indicator, 2D regions A and B have different sampling density or interval in 2D domain, e.g. 2D region A may have been extracted from an ERP picture of resolution 8192×4096 and 2D region B may have been extracted from an ERP picture of resolution 4096×2048.

The above example embodiments equally apply when unequality indicators apply between sphere regions and/or 2D regions in addition to or instead of applying between views. For example, in the example embodiment for the SphereRegionQualityRankingBox, when the value of unequality_indicator_mask is non-zero and the quality_ranking values differ between regions, the bit positions that have a bit equal to 1 within the unequality_indicator_mask indicate the types of unequality that has been applied between regions. Here, the regions can be within the same view or in different views.

In an embodiment, more than one set of quality ranking signalling (e.g., SphereRegionQualityRankingBox, 2DRegionQualityRankingBox, RWQR descriptor) may be present for different combinations of unequality indicator masks. For example, a first SphereRegionQualityRankingBox can be present for spatial unequality and can contain quality ranking values according to spatial unequality, and a second SphereRegionQualityRankingBox can be present for SNR unequality and can contain quality ranking values according to SNR unequality.

In an embodiment, an order of more than one set of quality ranking signalling is indicated or pre-defined. The order may define that quality ranking of a second signalling level apply among the regions that have the same quality ranking in a first signalling level, if any. For example, it may be indicated or pre-defined that in quality ranking for spatial unequality, no other unequality is taken into account, and that in quality ranking for any other type of unequality, the quality ranking values only apply between regions that have the same quality ranking value for spatial unequality. Such signalling has the advantage that a set of bitstreams or Representations providing a suitable spatial resolution for the current viewport can be first selected, and from the set of bitstreams or Representations, the one that best matches e.g. the transmission throughput and/or decoding capabilities may be selected.

Figure 10:
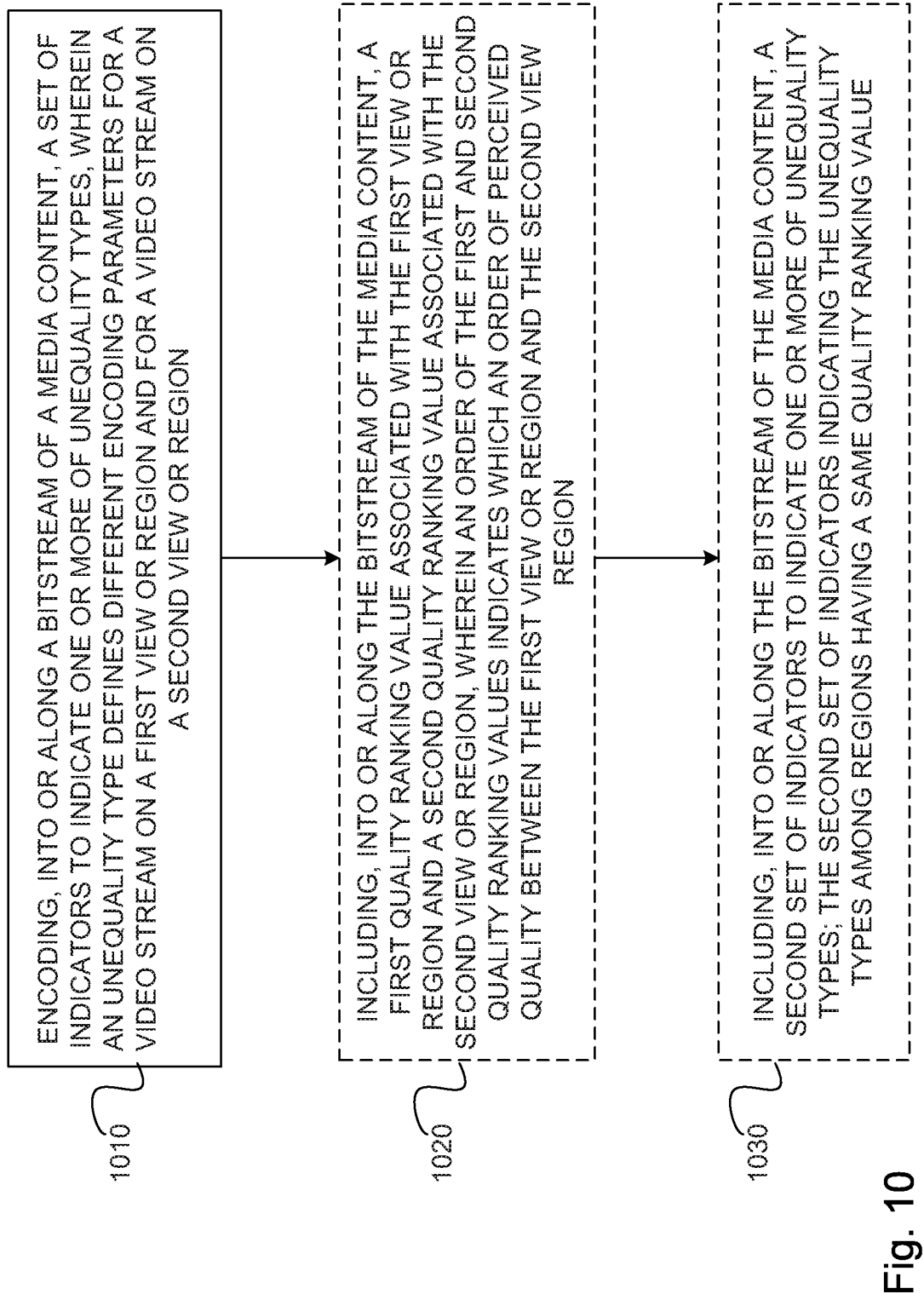
FIG. 10 is a flowchart of a method according to an embodiment.

A method for encoding according to an embodiment is illustrated in FIG. 10 as a flowchart. In the encoding method the video data is generated according to method of FIG. 10, and sent to a HMD, the example of which is shown in FIG. 3. The method as shown in the example of FIG. 9 comprises encoding 1010, into or along a bitstream of a media content, a set of indicators to indicate one or more of unequality types, wherein an unequality type defines different encoding parameters for a video stream on a first view or region and for a video stream on a second view or region. Optionally, the method further comprises—including 1020, into or along the bitstream of the media content, a first quality ranking value associated with the first view or region and a second quality ranking value associated with the second view or region, wherein an order of the first and second quality ranking values indicates which an order of perceived quality between the first view or region and the second view region. Optionally, the method further comprises including 1030, into or along the bitstream of the media content, a second set of indicators to indicate one or more of unequality types; the second set of indicators indicating the unequality types among regions having a same quality ranking value.

An apparatus according to an embodiment comprises means for implementing the method. For example, the apparatus comprises means for encoding, into or along a bitstream of a media content, a set of indicators to indicate one or more of unequality types, wherein an unequality type defines different encoding parameters for a video stream on a first view or region and for a video stream on a second view or region.

The decoding of the bitstream may be implemented by a HMD that receives the data and displays the video streams for the eyes of the viewer.

The present embodiments have advantages. For example, the visual quality can be kept constant, and the bandwidth required for transmission (e.g. streaming) and/or storage of the media content (such as stereoscopic 360-degree video) can be reduced. Transmission bandwidth reduction may be achieved for example through viewport-dependent content selection, where the content that provides higher quality for the currently visible viewport may be selected, while the properties of non-visible areas may be compromised e.g. to have smaller processing complexity. Another advantage is to match the transmitted or played content with user preferences on types and limits of unequality between left and right view. Yet another advantage is to facilitate sophisticated rate adaptation methods that may be viewport-adaptive and also attempt to optimize the perceived quality resulting from the choice of different types of unequalities between views and/or regions.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, some embodiments could be realized with the M3U manifest format of Apple HTTP Live Streaming (HLS).

In the above, some embodiments have been described with reference to including metadata or indications in a sample entry or alike. It needs to be understood that embodiments may be similarly realized by including metadata or indications in a dynamic metadata carriage mechanism, such as a sample group. For example, a SphereRegionQualityRankingBox may be used as a sample group description entry. Several sample group description entries of this type can be included in a SampleGroupDescriptionBox, and the sample group description entry that applies for a particular media sample is indicated with a SampleToGroupBox.

The phrase along the bitstream (e.g. indicating along the bitstream) may be used in claims and described embodiments to refer to out-of-band transmission, signaling, or storage in a manner that the out-of-band data is associated with the bitstream. For example, the phrase including an indication along the bitstream may mean including an indication in a container file (that also contains the bitstream) or in a description of the bitstream, such as DASH MPD. The phrase decoding along the bitstream or alike may refer to decoding the referred out-of-band data (which may be obtained from out-of-band transmission, signaling, or storage) that is associated with the bitstream. For example, the phrase decoding an indication along the bitstream may mean decoding an indication from a container file (that also contains the bitstream) or from a description of the bitstream, such as DASH MPD.

In the above, some embodiments have been described with reference to including metadata or indications in or along a container file and/or parsing or decoding metadata and/or indications from or along a container file. It needs to be understood that indications or metadata may additionally or alternatively be encoded or included in the video bitstream, for example as SEI message(s) or VUI, and/or decoded in the video bitstream, for example from SEI message(s) or VUI. For example, a quality ranking SEI message may be specified, which comprises a quality ranking value and an unequality indicator mask, as described above. The quality ranking SEI message may be included in a regional nesting SEI message, and the specified region in the regional nesting SEI message may for example comprise one constituent picture of a stereoscopic frame-packed picture. Furthermore, it needs to be understood that indications or metadata may additionally or alternatively be included in a description, such as MPD of DASH, of any of a container file, a track, or a bitstream, and/or decoded from a description of any of a container file, a track, or a bitstream.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method comprising:
encoding, into or along a bitstream of a media content associated with a plurality of views, a set of indicators to indicate that encoding parameters of a first video stream relating to a first view or region differ from encoding parameters of a second video stream relating to a second view or region, wherein the set of indicators specifies that encoding parameters for the first video stream and encoding parameters for the second video stream are based on different horizontal or vertical sizes of first and second views or regions, respectively; and including, into or along the bitstream of the media content, a first quality ranking value associated with the first view and a second quality ranking value associated with the second view, wherein an order of the first and second quality ranking values indicate an order of perceived quality between the first view and the second view.

2. The method according to claim 1, further comprising:
including, into or along the bitstream of the media content, a second set of indicators to indicate one or more unequality types; the second set of indicators indicating the unequality types among views having a same quality ranking value.

3. The method according to claim 1, wherein the media content comprises one or more 360-degree pictures.

4. The method according to claim 1, wherein the set of indicators are encoded into respective bit positions of an unequality indicator mask.

5. An apparatus comprising at least one processor, and memory including computer program code, the memory and the computer program code configured to, with the at least one processor, cause the apparatus to:
encode, into or along a bitstream of a media content associated with a plurality of views, a set of indicators to indicate that encoding parameters of a first video stream relating to a first view or region differ from encoding parameters of a second video stream relating to a second view or region, wherein the set of indicators specifies that encoding parameters for the first video stream and encoding parameters for the second video stream are based on different horizontal or vertical sizes of first and second views or regions, respectively; and
include, into or along the bitstream of the media content, a first quality ranking value associated with the first view and a second quality ranking value associated with the second view, wherein an order of the first and second quality ranking values indicate an order of perceived quality between the first view and the second view.

6. The apparatus according to claim 5, wherein the apparatus is further caused to:
include, into or along the bitstream of the media content, a second set of indicators to indicate one or more unequality types; the second set of indicators indicating the unequality types among views having a same quality ranking value.

7. The apparatus according to claim 5, wherein the media content comprises one or more 360-degree pictures.

8. The apparatus according to claim 5, wherein the set of indicators are encoded into respective bit positions of an unequality indicator mask.

9. A computer program product embodied on a non-transitory computer readable medium, comprising computer program code configured to, when executed on at least one processor, cause an apparatus or a system to:
encode, into or along a bitstream of a media content associated with a plurality of views, a set of indicators to indicate that encoding parameters of a first video stream relating to a first view or region differ from encoding parameters of a second video stream relating to a second view or region, wherein the set of indicators specifies that encoding parameters for the first video stream and encoding parameters for the second video stream are based on different horizontal or vertical sizes of first and second views or regions, respectively; and
include, into or along the bitstream of the media content, a first quality ranking value associated with the first view and a second quality ranking value associated with the second view, wherein an order of the first and second quality ranking values indicate an order of perceived quality between the first view and the second view.

10. The computer program product according to claim 9, wherein the set of indicators are encoded into respective bit positions of an unequality indicator.

* * * * *